United States Patent [19]

Futamura

[11] 3,968,648

[45] July 13, 1976

[54] MANIFOLD REACTOR FOR AN AUTOMOBILE

[75] Inventor: Kazumasa Futamura, Toyota, Japan

[73] Assignee: Toyota Jidosha Kogyo Kabushiki Kaisha, Toyota, Japan

[22] Filed: Dec. 13, 1974

[21] Appl. No.: 532,468

[30] Foreign Application Priority Data
June 6, 1974 Japan............................. 49-63344

[52] U.S. Cl................................ 60/282; 123/122 A
[51] Int. Cl.² .................................... F02M 31/00
[58] Field of Search ............ 60/282, 304, 305, 323, 60/901; 123/122 A, 122 AA, 122 AB

[56] References Cited
UNITED STATES PATENTS

| | | | |
|---|---|---|---|
| 3,809,019 | 5/1974 | Stoltman | 60/901 |
| 3,817,220 | 6/1974 | Brumm | 60/901 |
| 3,877,444 | 4/1975 | Senga | 123/122 AB |

FOREIGN PATENTS OR APPLICATIONS 699,911  11/1953  United Kingdom............ 12.3/122 A Primary Examiner—Douglas Hart
Attorney, Agent, or Firm—Stewart and Kolasch, Ltd.

[57] ABSTRACT

A manifold reactor for an automobile comprising a reactor vessel which defines a reaction chamber for recombustion of combustible components contained in exhaust gases, said reactor vessel being further adapted to introduce the exhaust gas in said chamber to a riser portion of an intake manifold to heat same, wherein ports to introduce and discharge exhaust gas into and out of the reaction chamber and a port to introduce exhaust gas to the riser portion are arranged so that the gas traverses full flow path available in the reaction chamber before it reaches the riser portion to release heat to same.

5 Claims, 3 Drawing Figures

MANIFOLD REACTOR FOR AN AUTOMOBILE

BACKGROUND OF THE INVENTION

1. Field of the Invention

The present invention relates to a manifold reactor for an automobile and, more particularly, a manifold reactor having a reactor vessel which defines a reaction chamber for recombustion of combustible components contained in exhaust gases introduced therein, wherein said reactor is further designed to heat a riser portion of an intake manifold for better combustion of fuel air mixture.

2. Description of the Prior Art

To meet with the intensifying requirements for the purification of automobile exhaust gases, there have been proposed various kinds of exhaust gas purifying devices, one of which is a manifold reactor. The manifold reactor is a device to recombust harmful combustible components such as HC and CO contained in the exhaust gas delivered from an engine before it is discharged to the atmosphere. For this purpose, the manifold reactor incorporates a reaction chamber for the recombustion of the combustible components.

The reaction chamber must be of proper size so as to allow for the exhaust gas to stay therein for a time long enough to accomplish satisfactory recombustion of combustible components contained in the exhaust gas. Furthermore, the reaction chamber requires good heat insulation in order to maintain a temperature high enough to accomplish the recombustion of combustible components. In the case of a rich reactor which employs secondary air for recombustion, a structure suitable for high mixing of the secondary air and exhaust gas is required. Thus, there are various conditions to be considered for a proper design of the reaction chamber of a manifold reactor.

When a manifold reactor is employed in a cross flow type engine only for the purpose of purifying exhaust gas, it is relatively easy to design a manifold reactor in which the aforementioned conditions are satisfied. However, when a manifold reactor is mounted on the same side of a counterflow type engine together with an intake manifold, the manifold reactor is usually mounted below the intake manifold so as to heat a riser portion of the intake manifold for the purpose of preheating fuel air mixture delivered from a carbureter to effect better combustion thereof. In addition to the primary object of purifying exhaust gases, and, in this case, there has been a problem in that not only the structure of the manifold reactor becomes complicated but also the temperature of the exhaust gas in the reactor chamber lowers due to heat absorption by the riser portion to such an extent that recombustion of combustible components is sometimes impeded.

FIG. 3 in the accompanying drawing shows a typical example of a conventional manifold reactor of the abovementioned type. In FIG. 3, an intake manifold 21 connected to a body 20 of an engine forms a riser portion 23 below a carbureter 22. An exhaust gas inlet tube 24 connected to the body 20 is introduced into a reaction chamber 26 of a body or reactor vessel of manifold reactor generally shown by 25. The body 25 is formed with a riser port 27 at its upper portion, whereby the reaction chamber 26 communicates to a bottom wall of the riser portion 23 through said riser port. The body 25 of the manifold reactor is further formed with an exhaust gas outlet port 29 which communicates to an exhaust pipe 28. The exhaust port 29 opens to an internal space of the reaction chamber 26. At a lower portion of the reaction chamber 26 there is provided an upwardly curved deflector 30.

The exhaust gas discharged from the engine flows through the inlet port 24 and enters into the reaction chamber 26 as indicated by arrow headed lines, and begins recombustion in the reaction chamber. The gas is then diverted by the deflector 30 to flow toward the riser portion 23. The riser portion 23 absorbs heat from the exhaust gas and is heated up, whereby atomization of fuel air mixture flowing through the intake manifold 21 is accelerated. The gas which has been cooled by releasing heat flows further through a remaining path as shown by an arrow-headed line and is exhausted from the exhaust port 29. In a conventional structure of this kind, the heat loss suffered by the exhaust gas due to heat absorption by the riser portion 23 is relatively high, whereby the temperature of the exhaust gas substantially lowers sometimes beyond the limit required for recombustion of HC and CO. Furthermore, the serious defect in the conventional structure resides in that the abovementioned heat loss is caused before the exhaust gas introduced into the reaction chamber traverses a substantial part of the flow path afforded by the reaction chamber. If the temperature of exhaust gas has once lowered, the remaining flow path, even if it is long, does not effectively contribute to recombustion of combustible components. Therefore, the efficiency of the conventional reactor as shown in FIG. 3 is relatively low. Furthermore, in the conventional structure, the riser portion 23 can only receive a relatively small amount of heat from the exhaust gas because the temperature of gas has not yet been sufficiently raised by recombustion of combustible components before it reaches the riser portion and, accordingly, sufficient heat is not available for the riser portion at the time of starting up the engine when stronger heating is desirable for better combustion of fuel air mixture.

SUMMARY OF THE INVENTION

Therefore, it is the object of the present invention to provide an improved manifold reactor for an automobile wherein the aforementioned drawbacks in the conventional manifold reactor have been effectively removed.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished by a manifold reactor for an automobile comprising a reactor vessel which defines a reaction chamber having at least first and second oppositely located end portions, said vessel having a riser port communicating to a bottom wall of a riser portion of an intake manifold, said riser port being located between said first and second end portions and fluid-dynamically confronting said second end portion, exhaust gas inlet ports connected to exhaust ports of an engine and opening to said chamber at said first end portion, and an exhaust gas outlet port connected to an exhaust gas pipe and opening to said chamber within a region of said riser port.

By the abovementioned constitution of a manifold reactor, the exhaust gas introduced into the reaction chamber traverses its full flow path afforded by the reaction chamber before it reaches the bottom wall of the riser portion to heat same, whereby complete recombustion of combustible components is effected and high temperature exhaust gas produced as a result is made available for the heating of the riser portion.

According to a particular feature of this invention, the riser port may preferably be bordered with a liner having an obliquely cut end which presents an effective end face area towards said second end portion of said chamber. In this connection, according to a further feature of this invention, said outlet port may preferably be defined by a liner extending from a wall portion of said vessel into an inside space of the reaction chamber in a manner that an inner end of said liner is positioned substantially in said liner which borders said riser portion. Further in this connection, according to still further feature of this invention, said inner end of said liner which defines said outlet port may preferably be obliquely cut in a manner that raised edge portions of said two liners are substantially laid one over the other.

According to still another feature of this invention, said riser port may incorporate a constricting orifice means to control heat transmission from the exhaust gases in the reaction chamber to the bottom wall of said riser portion.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
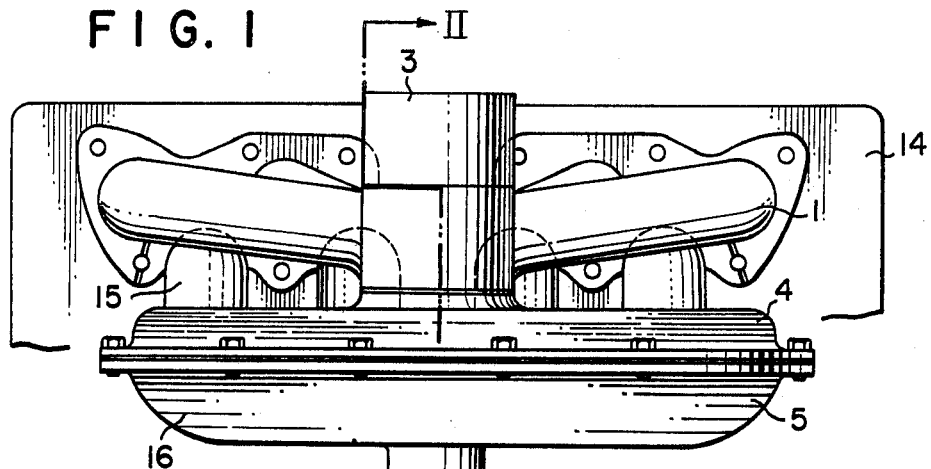
FIG. 1 is a side view showing a manifold portion of an engine incorporating an embodiment of the manifold reactor according to this invention.

In the following, the present invention will be described in more detail with reference to a preferred embodiment of the present invention and with particular reference to FIGS. 1 and 2.

Referring to these figs., an intake manifold 1 having four intake branch tubes is mounted to a body 14 of an engine. Corresponding to these four brance tubes, four exhaust tubes 15 are led out from the engine body 14, said exhaust tubes each being connected to a body or reactor vessel 16 of a manifold reactor. A carbureter 3 is mounted above the intake manifold 1 and at a portion located below the carburetor 3, and the intake manifold 1 is connected to the body 16 of the manifold reactor. The exhaust gas introduced into the reactor vessel 16 through the exhaust tubes 15 is finally discharged through an exhaust pipe 17 toward the atmosphere.

Figure 2:
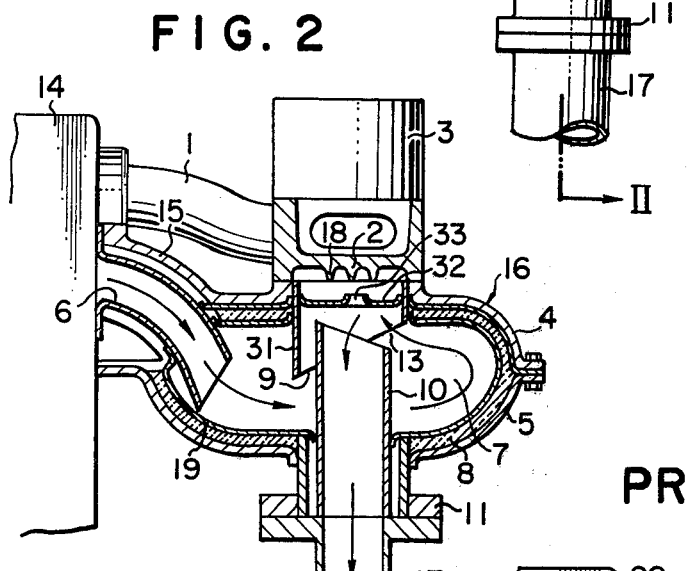
FIG. 2 is a sectional view along line II-II in FIG. 1.
Figure 3:
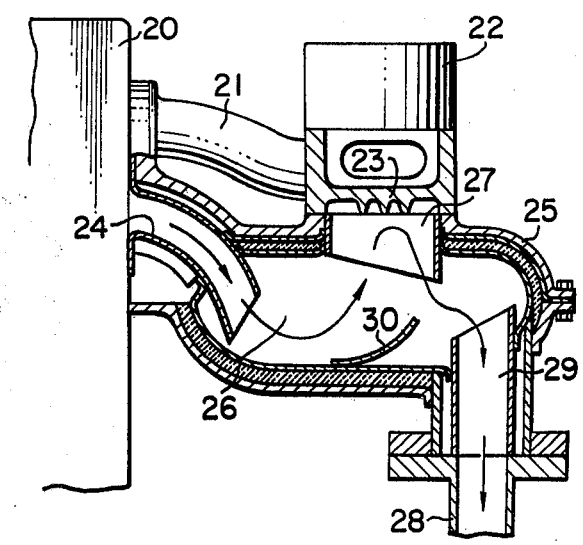
FIG. 3 is a view similar to FIG. 2 but shows a typical example of a manifold reactor as the prior art to this invention.

Referring particularly to FIG. 2 which is a section along line II-II in FIG. 1, a riser portion 2 is formed at a bottom portion of the intake manifold 1 just below the carbureter 3. The riser portion 2 is usually formed with a number of fins 18. The body or reactor vessel 16 of the manifold reactor is made of vessel halves 4 and 5 which are clamped together by bolts at their peripheral edges. Within an assembly of the halves 4 and 5, there is provided an inner wall 19 made of a thin plate with interposition of a heat insulating layer 8. A space confined by the inner wall 19 forms a reaction chamber 7.

In the reaction chamber 7, there opens inlet port liners 6, each of which is connected to an exhaust system incorporated in the engine body 14. Exhaust gas of the engine is introduced into the reaction chamber 7 through the inlet port liners 6. The reaction chamber 7 is opened to a bottom wall of the riser portion 2 at its upper central portion by way of an opening formed at an upper wall and a riser port liner 31 having a rectangular or circular cross section is mounted through said opening. A lower or inner end of the riser port liner 31 is cut obliquely to open toward an end of the reaction chamber opposite to a portion where the inlet port liner 6 opens. The riser port liner 31 forms a riser port 9 which connects the riser portion 2 and the reaction chamber 7. Toward the riser port 9 in a manner to confront thereto extends an outlet port liner 10 from a lower wall of the reaction chamber 7. The outlet port liner 10 has a circular cross section and its cross sectional contour is designed to be smaller than that of the riser port liner 31. An upper or inner end of the outlet port liner 10 is also cut obliquely to open toward the aforementioned end portion of the reaction chamber located oppositely to the inlet port liner 6. Furthermore, in the shown embodiment, the upper end of the outlet port liner 10 is partly inserted into the riser port liner 31 in a manner to form, in co-operation, a port 13 opened toward said end portion of the reaction chamber located opposite to the inlet port liners 6, said opening 13 serving as an entrance to the riser port 9. The outlet port liner 10 provides for an exhaust port, said liner being connected to the exhaust pipe 17 by way of its lower flange 11. The exhaust gas discharged from the engine body 14 flows through the inlet port liners 6 as shown by arrow headed lines and enter into the reaction chamber 7. The exhaust gas then flows toward the end portion of the reaction chamber located oppositely to the inlet port liner 6 while recombustion of combustible components contained in the exhaust proceeds. Since the exhaust gas traverses from one end to the other of the reaction chamber 7, a long staying time in the reaction chamber is available for the exhaust gas, whereby recombustion of combustible components is sufficiently effected before the gas reaches the other end or further reaches the riser port 9 after having turned around said other end. As a result of complete recombustion of combustible components, not only purification of exhaust gas is accomplished, but also heat is generated to raise the temperature of exhaust gas. Thus, the exhaust gas which has been purified and heated up to a sufficiently high temperature is introduced into the riser port 9 through the opening 13 and provides for good heating of the riser portion 2 to accelerate sufficiently the vapourization of fuel air mixture in the intake manifold 1. The gas which has been cooled down by releasing heat to the riser portion 2 is discharged through the outlet port liner 10 and exhaust pipe 17 toward the atmosphere.

Furthermore, as shown in FIG. 2, the riser port 9 may be provided with constricting means 32 having an orifice 33. This means is provided to avoid overheating of the riser portion in normal operating condition of the automobile, because otherwise a drawback such as increase of harmful component in exhaust gas or unstable operation of the engine might occur. However, since it is favourable that the riser portion 2 is sufficiently heated at the time of starting up the engine, the constricting means 32 may preferably be of a type to provide a controlled opening which can be altered according to operational conditions of the engine.

From the foregoing, it will be appreciated that the manifold reactor according to this invention is as simple as the conventional manifold reactor in its structure but nevertheless provides for much better purification of exhaust gas as well as better heating of an intake manifold.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A manifold reactor for an automobile comprising a reactor vessel which defines a reaction chamber having at least first and second oppositely located end portions, said vessel having a riser port communicating to a bottom wall of a riser portion of an intake manifold, said riser port being located between said first and second end portions and bordered with a liner having an obliquely cut end which presents an effective end face area toward said second end portion of said chamber, thereby fluid-dynamically confronting said second end portion, exhaust gas inlet ports connected to exhaust ports of an engine and opening to said chamber at said first end portion, and an exhaust gas outlet port connected to an exhaust gas pipe and opening to said chamber within a region of said riser port.

2. A manifold reactor according to claim 1, wherein said outlet port is defined by a liner extending from a wall portion of said vessel into an inside space of said chamber, an inner end of said second-mentioned liner being positioned substantially in said first mentioned liner which borders said riser port.

3. A manifold reactor according to claim 2, wherein said inner end of said second mentioned liner which defines said outlet port is obliquely cut in the manner that raised edge portions of said two liners are substantially laid one over the other.

4. A manifold reactor according to claim 1, wherein said riser port incorporates a constricting orifice means to control heat transmission from the exhaust gas in said chamber to said bottom wall of said riser portion.

5. A manifold reactor according to claim 4, wherein said constricting orifice means provides an opening which is controlled according to operational conditions of the engine.

* * * * *